United States Patent [19]

Fukui

[11] Patent Number: 4,494,773
[45] Date of Patent: Jan. 22, 1985

[54] TILTABLE STEERING FOR INDUSTRIAL VEHICLE OR THE LIKE

[75] Inventor: Osamu Fukui, Musashimurayama, Japan

[73] Assignee: Nissan Motor Co., Ltd., Yokohama, Japan

[21] Appl. No.: 413,530

[22] Filed: Aug. 31, 1982

[30] Foreign Application Priority Data

Sep. 30, 1981 [JP] Japan ............................. 56-155978

[51] Int. Cl.$^3$ .............................................. B62D 1/18
[52] U.S. Cl. ................................................... 280/775
[58] Field of Search .......................... 280/775; 180/78

[56] References Cited

U.S. PATENT DOCUMENTS

| | | | |
|---|---|---|---|
| 3,198,030 | 8/1965 | Miller et al. | 280/775 |
| 3,799,569 | 3/1974 | Baker | 280/775 |
| 3,803,939 | 4/1974 | Schenten | 280/775 |

FOREIGN PATENT DOCUMENTS

| | | |
|---|---|---|
| 54-89737 | 12/1977 | Japan . |
| 54-19440 | 7/1977 | Japan . |
| 941509 | 11/1963 | United Kingdom . |
| 1523638 | 9/1978 | United Kingdom . |

*Primary Examiner*—Joseph F. Peters, Jr.
*Assistant Examiner*—Kenneth R. Rice
*Attorney, Agent, or Firm*—Lane, Aitken & Kananen

[57] ABSTRACT

A tiltable steering arrangement is arranged with the axis of rotation thereof relatively close to the steering wheel and in the near vicinity of a relatively heavy valve arrangement associated therewith. A locking device is located at a distance from the axis of rotation and on the other side thereof with respect to the steering wheel. This provides a mechanical advantage with allows for a less robust locking mechanism which is not subject to large moments of force which would otherwise result if the mass were located at a distance from the axis of rotation while increasing the amount of angle adjustment possible.

3 Claims, 6 Drawing Figures

TILTABLE STEERING FOR INDUSTRIAL VEHICLE OR THE LIKE

BACKGROUND OF THE INVENTION

1. Field of the Invention

The present invention relates generally to a tiltable steering for an industrial vehicle or the like and more specifically to an improved arrangement wherein the degree of tilt can be increased while decreasing the structural stress which is apt to occur in the arrangement.

2. Description of the Prior Art

Two previously proposed arrangements are shown in FIGS. 1 and 2 of the drawings, respectively. In the first of these (FIG. 1), a steering wheel 1 is mounted on the upper end of a steering column 2. At the lower end of the steering column is a power steering pressure control device and housing 3. Fixed to the housing in which the pressure control valve is disposed is a bracket 4 which is pivotally mounted at the lower end thereof on a stationary bracket 5 fixedly secured to a portion of the vehicle body 6. A second stationary bracket 7 is formed with an arcuate slot 8 therein. The center of curvature of the slot 8 is co-incident with the axis T of the pin 9 about which the bracket 4 is pivotable so that a pin 10 extending from the pressure control valve housing 3 may slide therein to permit the angle of the steering column 2 to be adjusted. To fix the column 2 in a given selected position, a lock mechanism 11 having a lock lever 12 is provided for manual operation by the driver. To permit the steering column to move relative to the instrument panel, a slot S is formed therein.

In the second arrangement (FIG. 2), the instrument panel housing 13 per se is adapted to be supported and movable with the column 2 and the bracket 4. With this arrangement, the bracket 4 supports the weight of the steering column 2, the instrument panel and associated housing 13.

However, both of these arrangements have suffered from the drawbacks that the distance between the axis T about which the steering column pivots and the steering wheel 1 is maximized which undesirably limits the range through which the column may be tilted and that an undesirably high load is placed on the locking mechanism 11 and stationary bracket 7 due to a relatively large mass (viz., the power steeing pressure control valve and valve housing and/or instrument panel and housing) being located at a distance from the axis of rotation T.

SUMMARY OF THE INVENTION

The present invention features a tiltable steering arrangement wherein the axis of rotation or fulcrum is located relatively close to the steering wheel (maximizing the angle through which the steering column may be tilted) and in the near vicinity of the power steering pressure control valve unit so as to minimize the moment of force produced by the mass thereof. This arrangement further allows the locking mechanism to be located at a distance from the axis of rotation and thus allow for a less robust lighter mechanism due to the mechanical advantage accordingly derived.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENTS

Figures 1A, 1B:
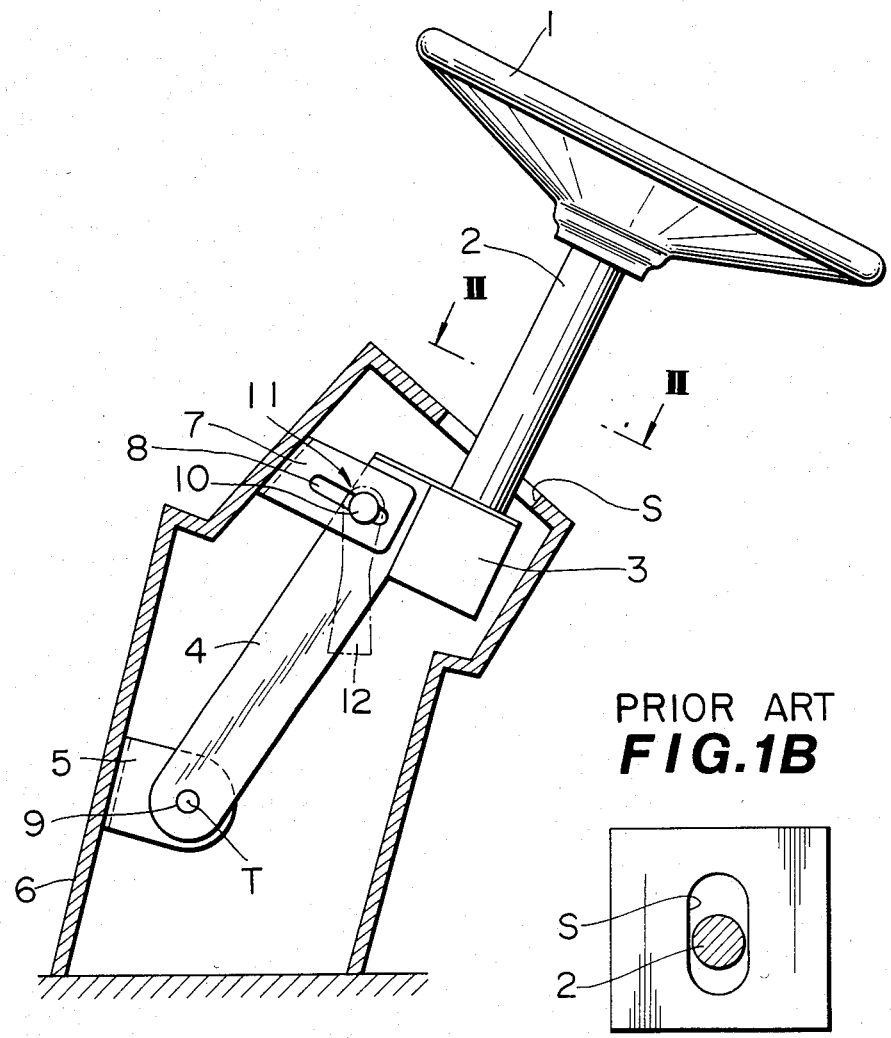
FIG. 1A is a sectional elevation of a prior art arrangement briefly discussed in the opening paragraphs of this document.
FIG. 1B is a section taken along section line II—II of FIG. 1.
Figure 2:
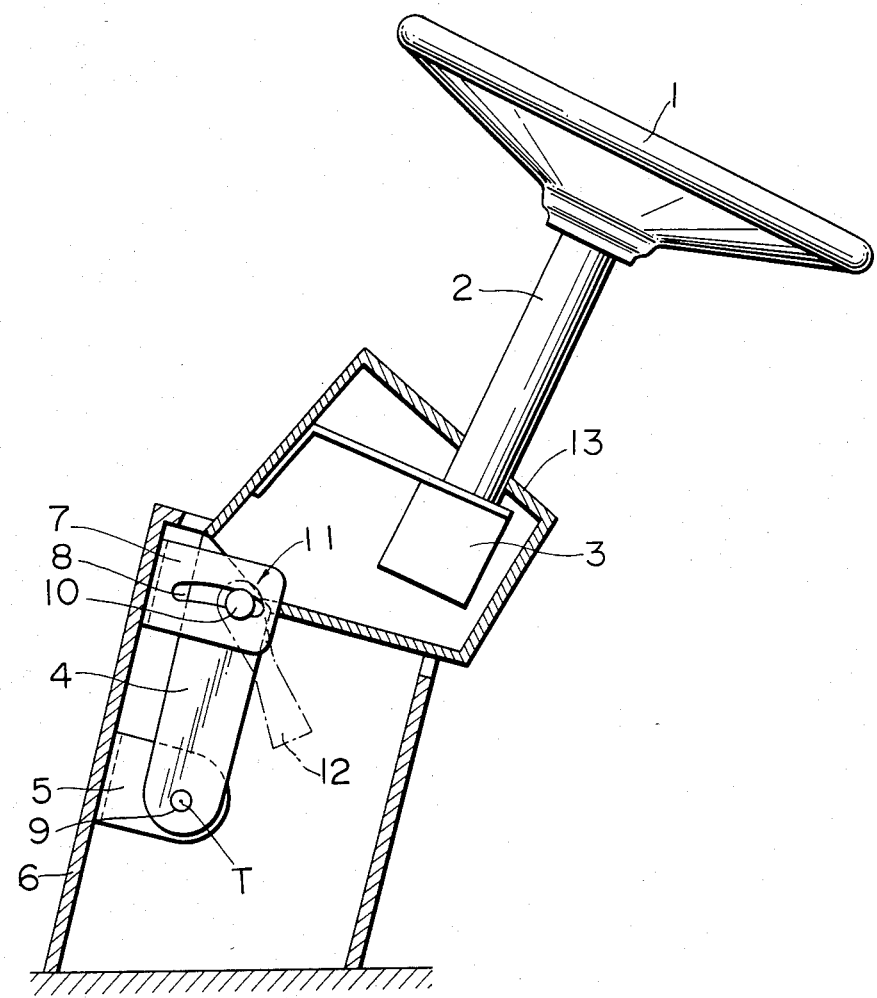
FIG. 2 is a sectional elevation of a second prior art arrangement also discussed in the opening paragraphs of this document.
Figure 3:
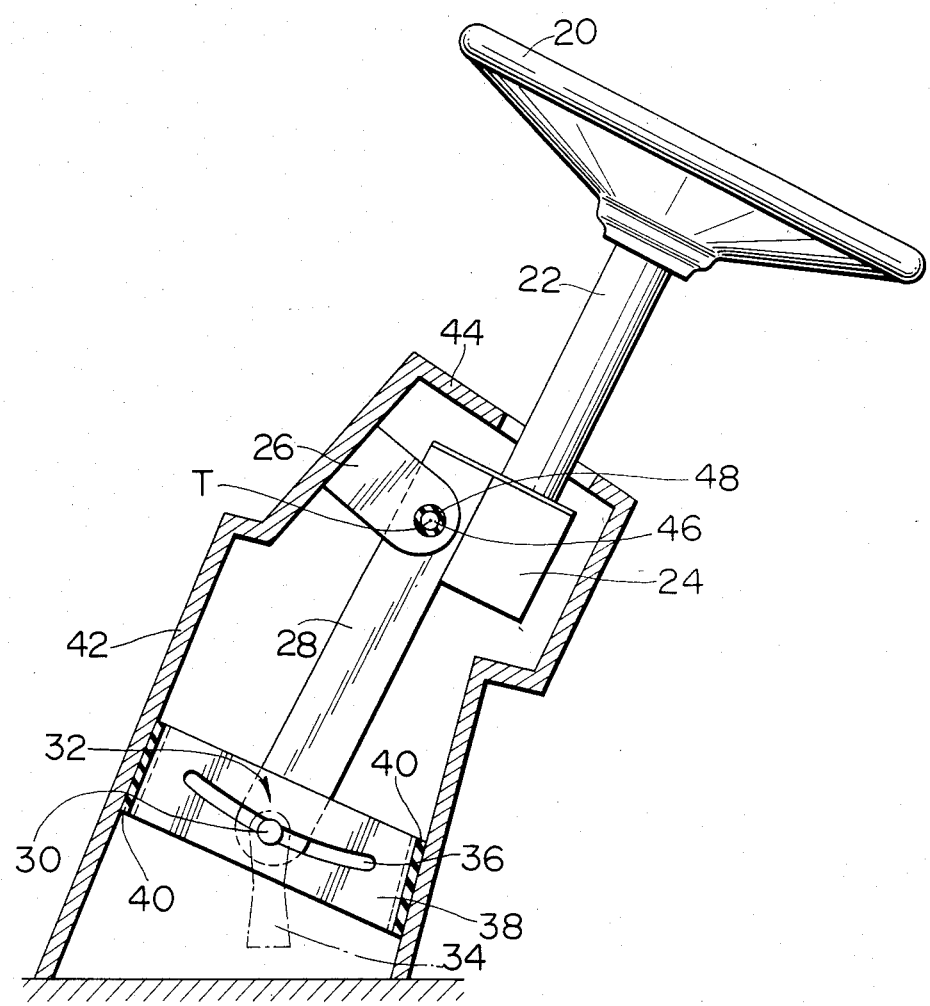
FIG. 3 is a sectional elevation of an embodiment of the present invention.

FIG. 3 shows an embodiment of the present invention wherein a steering wheel 20 is mounted on a steering column 22. A power steering pressure control valve housing 24 is located at the bottom of the steering column 22 and adapted to fluidly communicate with the steerable wheels of the vehicle (not shown). A stationary bracket 26 (or brackets) is adapted to pivotally support the steering column 22 and valve housing 24 rendering them pivotable about an axis or fulcrum T.

Extending downwardly from the valve housing 24 is a bracket 28 the lower end of which is provided with a pin 30 and locking mechanism 32 (including a locking handle 34). The pin 30 is adapted to slide in an arcuate slot 36 the center of curvature of which is coincident with the axis of rotation T. The bracket 38, in which the curved or arcuate slot 36 is located, is mounted via vibration insulators 40 to a pillar like portion 42 of the vehicle body on which an instrument panel 44 is disposed. The pin or pins 46 which support the valve housing 24 on the stationary brackets 26 are also provided with a suitable vibration absorbing bushing 48 or the like.

Figure 4A:
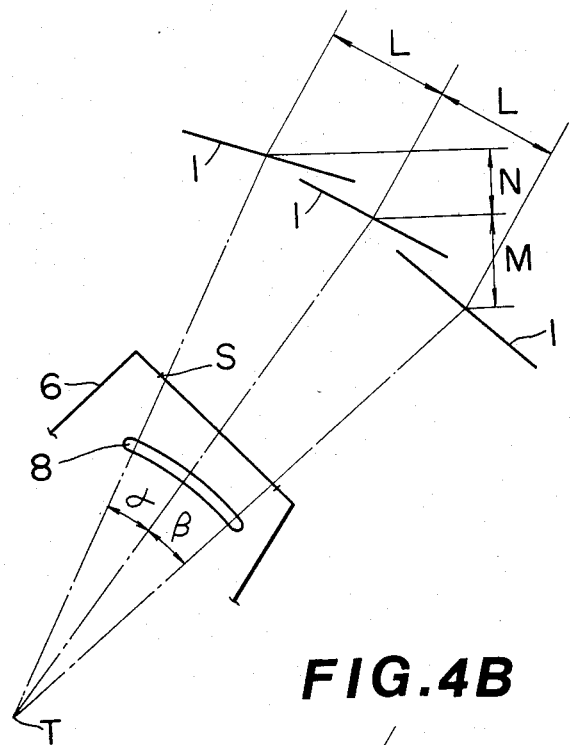
FIGS. 4A and 4B are diagrams showing the tilting possible with the prior art arrangement and the present invention, respectively.
Figure 4B:
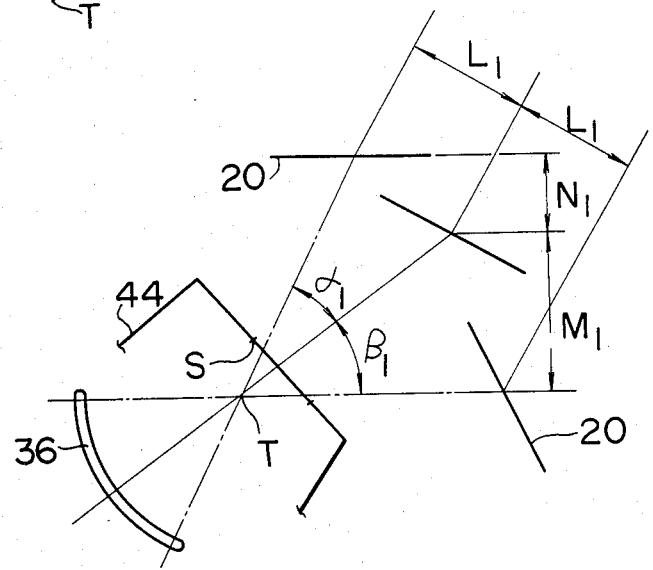

FIGS. 4A and 4B highlight the difference in tilting characteristics obtained by the prior art arrangements and the present invention. In FIG. 4A the letter "T" indicates the axis of rotation or fulcrum point of the steering column, "L" indicates the distances through which the steering wheel moves from a neutral position to the maximum forward and rearward positions, "α" and "β" the angles through which the steering column moves to assume its maximum and rearward positions, and "N" and "M" indicate the vertical displacement of the wheel when moved from its home position to one of the forward or rearward positions thereof. It will be readily noted that with the present invention that the following relation holds $$\alpha_1 > \alpha, \beta_1 > \beta, N_1 \text{ and } M_1 > M$$

wherein $L_1$, $N_1$, $M_1$, $\alpha_1$ and $\beta_1$ indicate the same parameters in FIG. 4B as in the case of FIG. 4A.

It will also be appreciated from FIG. 4A that the slot S which must be formed in the instrument panel to allow for movement of the steering column can be notably reduced as compared with the prior arrangements despite the notable increase in tiltability.

What is claimed is:

1. A tiltable steering arrangement for a vehicle having a body, comprising:
   a steering wheel;

a steering column operatively connected at one end thereof with said steering wheel;

a valve housing mounted at a second end of said steering column;

a first bracket connected with said valve housing at a first end thereof;

a second bracket connected with said vehicle body, said second bracket pivotally supporting said steering wheel and steering column at a location in close proximity of said valve housing so that the moment of force produced by said valve housing about said location is minimized;

locking means mounted at a second end of said first bracket so as to be remote from said location; and a third bracket connected with said vehicle body, said third bracket being arranged to cooperate with said locking means in a manner to permit the second end of the said first bracket to be selectively locked thereto.

2. A tiltable steering arrangement as claimed in claim 1, wherein said first bracket is formed with a pin near the first end thereof, said pin being received in an aperture formed in said second bracket through a vibration insulator, said pin pivotally supporting said steering wheel and steering column at said location in close proximity of said valve housing and said center of gravity.

3. A tiltable steering arrangement for a vehicle having a body, comprising:

a steering wheel;

a steering column operatively connected at one end thereof with said steering wheel;

a valve housing mounted at a second end of said steering column;

a first bracket connected with said valve housing at a first end thereof;

locking means mounted at a second end of said first bracket;

a second bracket connected with said vehicle body, said second bracket pivotally supporting said steering wheel and steering column at a location in close proximity of said valve housing; and a third bracket connected with said vehicle body, said third bracket being arranged to cooperate with said locking means in a manner to permit the second end of said first bracket to be selectively locked thereto, said first bracket being formed with a pin near the first end thereof, said pin being received in an aperture formed in said second bracket through a vibration insulator, said pin pivotally supporting said steering wheel and steering column at said location in close proximity of said valve housing, said steering wheel, steering column, valve housing and first bracket being free of bias by mechanical biasing means and freely pivotal about said pin within predetermined limits upon release of said locking means.

* * * * *